(12) United States Patent
Takahata et al.

(10) Patent No.: US 7,589,798 B2
(45) Date of Patent: Sep. 15, 2009

(54) TOUCH PANEL HAVING UPPER ELECTRODE PLATE INCLUDING ELECTRODE, POLARIZING PLATE, QUARTER WAVE PLATE AND HEAT-RESISTANT TRANSPARENT RESIN PLATE

(75) Inventors: Kazuhiko Takahata, Kyoto (JP); Takao Hashimoto, Kyoto (JP); Kazuhiro Nishikawa, Kyoto (JP); Takeshi Asakura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 113 days.

(21) Appl. No.: 10/488,558

(22) PCT Filed: Sep. 5, 2002

(86) PCT No.: PCT/JP02/09009

§ 371 (c)(1),
(2), (4) Date: Mar. 4, 2004

(87) PCT Pub. No.: WO03/023594

PCT Pub. Date: Mar. 20, 2003

(65) Prior Publication Data
US 2004/0239641 A1    Dec. 2, 2004

(30) Foreign Application Priority Data
Sep. 6, 2001    (JP)    ............................. 2001-269749

(51) Int. Cl.
*G02F 1/1335* (2006.01)

(52) U.S. Cl. .......................................... 349/12; 345/173

(58) Field of Classification Search ................... 349/12; 345/173
See application file for complete search history.

(56) References Cited

U.S. PATENT DOCUMENTS

| 5,818,559 A * | 10/1998 | Yoshida ...................... 349/122 |
| 5,852,487 A | 12/1998 | Fujimori et al. |
| 6,556,189 B1 * | 4/2003 | Takahata et al. ............. 345/173 |
| 6,572,941 B1 * | 6/2003 | Murakami et al. ............ 428/34 |
| 6,781,642 B2 * | 8/2004 | Nakanishi et al. ............. 349/12 |

(Continued)

FOREIGN PATENT DOCUMENTS

CN    1274996    11/2000

(Continued)

OTHER PUBLICATIONS

Microfilm of the specification and drawings annexed to the request of Japanese Utility Model Application No. 145258/1985 (Laid-open No. 53726/1987) (Seiko Epson Corp.) Apr. 3, 1987, p. 4, lines 13 to 17; Fig. 1.

(Continued)

*Primary Examiner*—David Nelms
*Assistant Examiner*—Nathanael R Briggs
(74) *Attorney, Agent, or Firm*—Wenderoth, Lind & Ponack, L.L.P.

(57) ABSTRACT

An upper electrode plate has a 0.15 to 0.8 mm thick optically isotropic heat-resistant transparent resin plate having a glass transition temperature characteristic of not less than 150° C. The heat-resistant transparent resin plate is laminated directly or indirectly on a quarter wave plate all over their surfaces.

12 Claims, 3 Drawing Sheets

U.S. PATENT DOCUMENTS

| | | | |
|---|---|---|---|
| 6,812,974 B1 * | 11/2004 | Hinata et al. | 349/12 |
| 6,888,595 B2 * | 5/2005 | Umemoto | 349/113 |
| 2001/0000961 A1 | 5/2001 | Hikida et al. | |
| 2001/0024415 A1 * | 9/2001 | Takemori et al. | 369/112.11 |
| 2001/0026330 A1 * | 10/2001 | Oh | 349/12 |
| 2001/0043291 A1 * | 11/2001 | Kono et al. | 349/12 |

FOREIGN PATENT DOCUMENTS

| | | |
|---|---|---|
| EP | 1046946 A1 | 10/2000 |
| EP | 1 058 205 A1 | 12/2000 |
| EP | 1 087 286 A1 | 3/2001 |
| JP | 62-53726 | 4/1987 |
| JP | 5-127822 | 5/1993 |
| JP | 9-203890 | 8/1997 |
| JP | 09-203890 | 8/1997 |
| JP | 11-53118 | 2/1999 |
| JP | 11-202322 | 7/1999 |
| JP | 2000-43202 | 2/2000 |
| JP | 2000-089914 | 3/2000 |
| JP | 2000-89914 | 3/2000 |
| JP | 2000-105669 | 4/2000 |
| JP | 2000-108241 | 4/2000 |
| JP | 2000-321558 | 11/2000 |
| WO | 99/64950 | 12/1999 |
| WO | 00/16251 | 3/2000 |
| WO | 00/70550 | 11/2000 |

OTHER PUBLICATIONS

European Office Action issued May 14, 2009 in European Application No. 02 767 887.9.

* cited by examiner

TOUCH PANEL HAVING UPPER ELECTRODE PLATE INCLUDING ELECTRODE, POLARIZING PLATE, QUARTER WAVE PLATE AND HEAT-RESISTANT TRANSPARENT RESIN PLATE

TECHNICAL FIELD

The present invention relates to a high-durability touch panel which is free from occurrence of deterioration of its anti-reflection characteristics due to retardation changes even if left under a high-temperature environment for a long time and which allows comfortable input operations to be performed, and yet which is successful in workability during an assembly process. The panel is to be used primarily for car navigation or the like.

BACKGROUND ART

It has conventionally been practiced that a touch panel is disposed at frontage of LCD, organic EL, CRT, or other displays, which are widely used in such products as PDAs (Personal Digital Assistants), portable telephones, and personal computers. Basically, the touch panel is so structured that an upper electrode plate in which an upper electrode made of a transparent conductive film is formed on its lower surface, and a lower electrode plate in which a lower electrode made of a transparent conductive film is provided on its upper surface, are adhesively fixed only at their non-display area portions with the two electrodes opposed to each other via an air layer, wherein by pressing a part of a panel surface, the two electrodes insulated from each other by the air layer can be put into contact with each other and thereby into conduction, thus allowing an input operation to be performed. Also, each of the upper electrode plate and the lower electrode plate is formed of a single layer or by laminating a plurality of layers all over.

Then, for outdoor use, in order to prevent reflection of external light to improve visibility, a low-reflection touch panel can be used in which upper electrode plate 1 is formed by laminating, in an order from an upper electrode 2 side, at least a quarter wave plate 9 and a polarizing plate 10 whose absorption axis crosses an optical axis of the quarter wave plate 9 at an angle of 45° or 135° (see FIG. 4). That is, an anti-reflection filter of circular polarization type is formed by the quarter wave plate 9 and the polarizing plate 10 so that reflection of light incident from an external source at a transparent conductive film is efficiently cut. In addition, in a case where the display is an LCD, with only one quarter wave plate 9, even linearly polarized light coming incident for display use from an LCD side would be changed into circularly polarized light, and for this reason, a quarter wave plate whose optical axis perpendicularly crosses the quarter wave plate 9 in the upper electrode plate is further disposed in a lower electrode plate 3 to cancel a phase. That is, after being changed into circularly polarized light by the quarter wave plate on a lower electrode 4 side, the incident light is turned back to original linearly polarized light by the quarter wave plate 9 on the upper electrode 2 side.

Recently, in the automobile industry, there have been widespreading car navigation systems, which are used mainly by screen operation by remote control, and there have been discussed use of a touch panel on a display screen for more comfort of operability. In this case, there is an essential need for a touch panel having the aforementioned anti-reflection filter of a circular polarization type to prevent deterioration of visibility due to reflection of outdoor light such as sunlight. However, under summer's direct sunlight, vehicle interiors with windows closed may undergo a high-temperature environment over 70° C. In such a case, if left as it is for a long time, the touch panel would expand, whereby, since the quarter wave plate 9 and the polarizing plate 10 in the upper electrode plate 1 differ from each other in a stretching direction in a process of their axis formation, there is a fear that those plates result in mutually different expansional directions 11 during a state of their being bonded together directly or indirectly all over (see FIG. 5), thereby causing occurrence of waviness or strain in the upper electrode plate 1 of the touch panel. Also, under a high-temperature environment, since the quarter wave plate 9 in the upper electrode plate 1 is free to expand at central portions while blocked or, conversely, forcedly expanded by an effect of partial bonding and fixation with the lower electrode plate 3 in peripheral portions, there is a fear that stress 12 may be applied only to peripheral portions of the quarter wave plate 9 (see FIG. 6), causing the quarter wave plate 9 to be changed in retardation value in vicinities of peripheral portions of a display area and, as a result, impairing anti-reflection characteristics.

Therefore, for use in car navigations, there has been provided a touch panel in which a glass plate 13 is disposed in upper electrode plate 1 and bonded with quarter wave plate 9 all over with a view to avoiding the above-described problems (see FIG. 7). By bonding the glass plate with the quarter wave plate 9 all over in the upper electrode plate 1, the quarter wave plate 9 and polarizing plate 10 become almost free from occurrence of expansion even under a high-temperature environment over 70° C., thus held in a non-wavy, non-strained state. Also, by bonding this high-rigidity glass plate with the quarter wave plate 9 all over, stress applied to the quarter wave plate 9 is dispersed so that the quarter wave plate 9 becomes almost free from occurrence of retardation changes, thus losing anti-reflection characteristics less.

However, the upper electrode plate 1 is a part that makes direct contact with a finger or pen or the like, and in a case where a glass plate is used in the upper electrode plate 1, increased thickness of the upper electrode plate 1 would cause an input operation with the pen or finger to feel heavier because of high rigidity of the glass plate. For comfortable input operation to be performed, it is necessary to set a glass thickness to an extremely thin one. Unfortunately, with use of a glass plate having such a thickness, the touch panel would become highly liable to fracture, so that the touch panel would become quite difficult to handle during its assembly, and moreover, this glass could fracture during an input operation of the touch panel.

Accordingly, with a view to solving these issues, an object of the present invention is to provide a high-durability touch panel which is free from occurrence of deformation of its appearance configuration as well as deterioration of its anti-reflection characteristics due to retardation changes even if left under a high-temperature environment for a long time, and which allows comfortable input operations to be performed, and yet which is successful in workability during an assembly process.

SUMMARY OF THE INVENTION

In order to achieve the above object, the present invention has the following constitution.

According to a first aspect of the present invention, there is provided a high-durability touch panel in which an upper electrode plate, in which an upper electrode formed of a transparent conductive film is provided as its lower surface, and a lower electrode plate, in which a lower electrode formed of a transparent conductive film is provided as its upper surface, are bonded and fixed at regions except a display area so that these two electrodes are opposed to each other with an air layer therebetween, with the upper electrode plate comprising a lamination of, in an order from an upper electrode side, at least a quarter wave plate and a polarizing plate whose absorption axis crosses an optical axis of the quarter wave plate at an angle of 45° or 135°, wherein the upper electrode plate comprises a 0.15 to 0.8 mm thick optically isotropic heat-resistant transparent resin plate having characteristics of a glass transition temperature of not less than 150° C. and an absorption coefficient of not more than 1.3%, and the heat-resistant transparent resin plate is laminated directly or indirectly to the quarter wave plate all over their surfaces, i.e. the optically heat-resistant transparent resin plate is co-extensive with the quarter wave plate.

According to a second aspect of the present invention, there is provided the high-durability touch panel according to the first aspect, wherein the heat-resistant transparent resin plate is disposed between the quarter wave plate and the polarizing plate.

According to a third aspect of the present invention, there is provided the high-durability touch panel according to the first aspect, wherein the heat-resistant transparent resin plate is disposed below the quarter wave plate.

According to a fourth aspect of the present invention, there is provided the high-durability touch panel according to the first aspect, wherein the heat-resistant transparent resin plate is disposed above the polarizing plate.

According to a fifth aspect of the present invention, there is provided the high-durability touch panel according to any one of the first to fourth aspects, wherein the glass transition temperature of the heat-resistant transparent resin plate is not less than 170° C.

According to a sixth aspect of the present invention, there is provided the high-durability touch panel according to any one of the first to fourth aspects, wherein a thickness of the heat-resistant transparent resin plate is 0.2 to 0.7 mm.

According to a seventh aspect of the present invention, there is provided the high-durability touch panel according to any one of the first to fourth aspects, wherein an absorption coefficient of the heat-resistant transparent resin plate is not more than 1%.

According to an eighth aspect of the present invention, there is provided the high-durability touch panel according to any one of the first to fourth aspects, wherein a moisture-proof PET film is disposed as a satin layer, with low-reflection and anti-fouling functions, on the polarizing plate or the heat-resistant transparent resin plate, whichever serves as an uppermost surface of the upper electrode plate.

According to a ninth aspect of the present invention, there is provided the high-durability touch panel according to any one of the first to fourth aspects, further comprising a seal layer for covering at least side-end peripheries of the upper electrode plate and side-end vicinities of the lower electrode plate.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
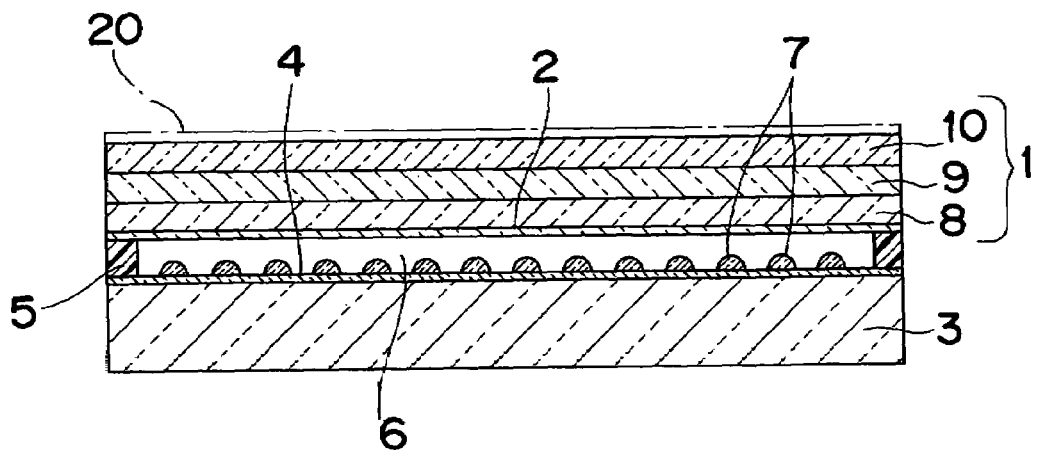
FIG. 1 is a sectional view showing a low-reflection touch panel having high durability according to a first embodiment of the present invention.

Before description of the present invention proceeds, it is to be noted that like parts are designated by like reference numerals throughout the accompanying drawings.

Figure 2:
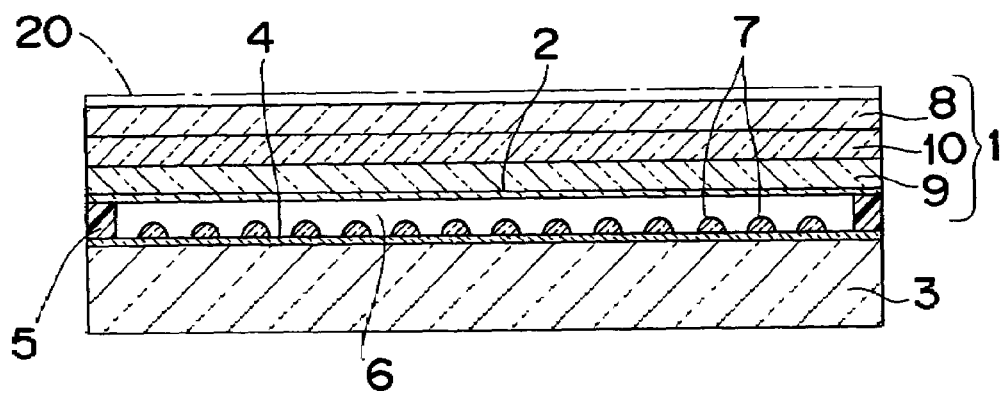
FIG. 2 is a sectional view showing a low-reflection touch panel having high durability according to a second embodiment of the present invention.
Figure 3:
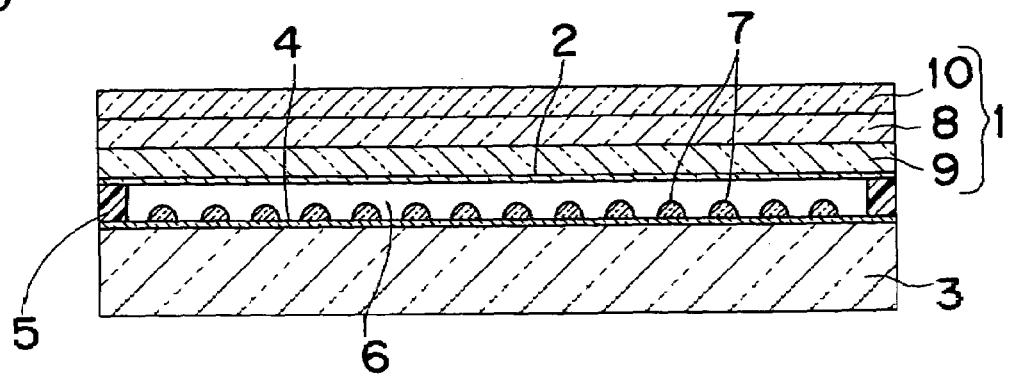
FIG. 3 is a sectional view showing a low-reflection touch panel having high durability according to a third embodiment of the present invention.
Figure 4:
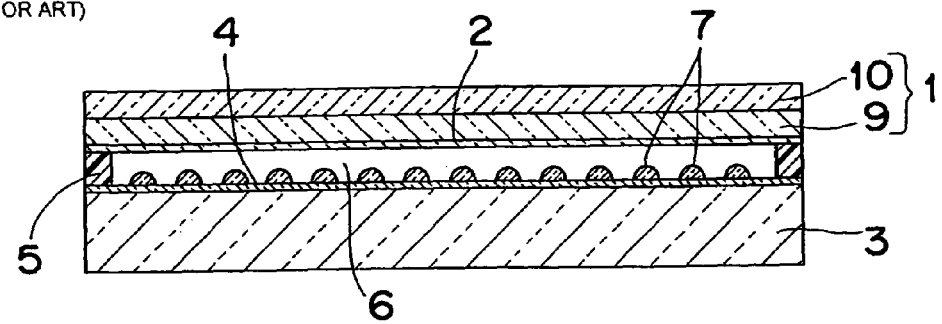
FIG. 4 is a sectional view showing a low-reflection touch panel according to prior art.
Figure 5:
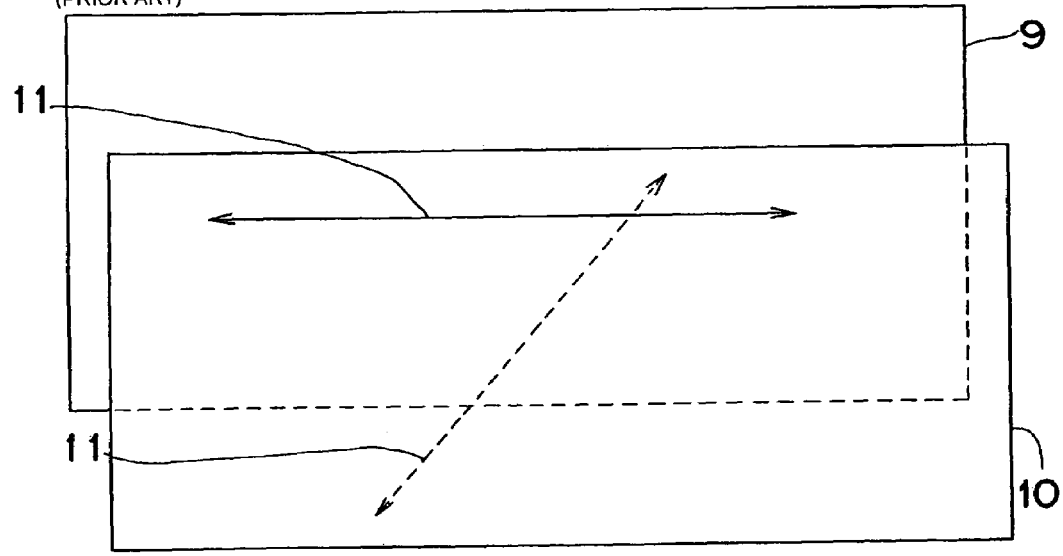
FIG. 5 is an exploded plan view showing changes under a high-temperature environment with respect to an upper electrode plate of the low-reflection touch panel of FIG. 4.
Figure 6:
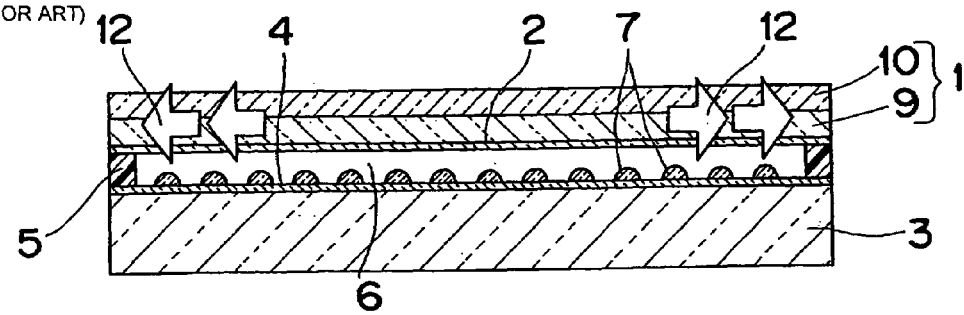
FIG. 6 is a sectional view showing stress applied to the upper electrode plate under a high-temperature environment with respect to the low-reflection touch panel of FIG. 4.
Figure 7:
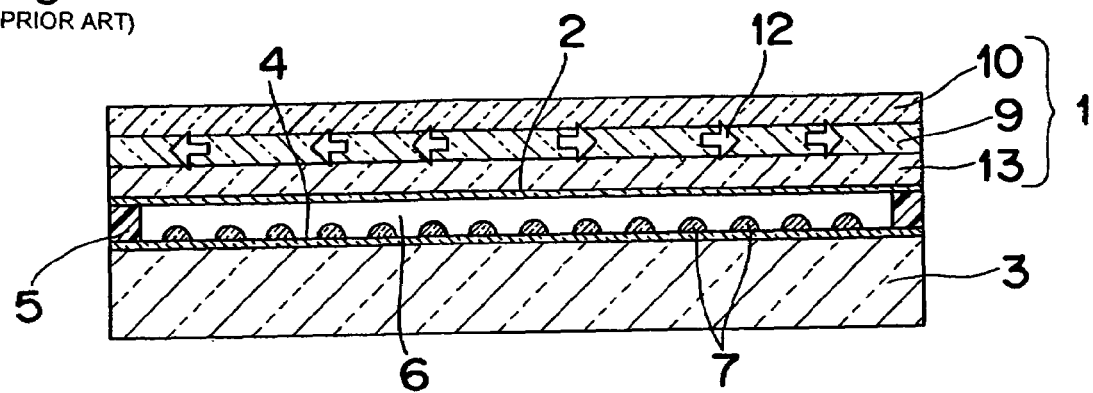
FIG. 7 is a sectional view showing a low-reflection touch panel having high durability according to prior art.

Hereinbelow, the present invention is described in detail with reference to the accompanying drawings. FIGS. 1 to 3 are sectional views showing low-reflection touch panels having high durability according to first to third embodiments of the present invention. In these figures, reference numeral 1 denotes an upper electrode plate, 2 denotes an upper electrode, 3 denotes a lower electrode plate, 4 denotes a lower electrode, 5 denotes an adhesive layer such as double-sided adhesive tape as an example, 6 denotes an air layer, 7 denotes a spacer, 8 denotes a heat-resistant transparent resin plate, 9 denotes a quarter wave plate, and 10 denotes a polarizing plate.

Basically, each touch panel is so structured that the upper electrode plate 1 in which the upper electrode 2 made of a transparent conductive film is provided as its lower surface, and the lower electrode plate 3 in which the lower electrode 4 made of a transparent conductive film is provided as its upper surface, are adhesively fixed only at their non-display area portions with the two electrodes 1 and 3 opposed to each other via the air layer 6. In a case of a low-reflection touch panel of a circular polarization type, the upper electrode plate 1 is implemented by one in which at least the quarter wave plate 9 and the polarizing plate 10, whose absorption axis crosses an optical axis of the quarter wave plate 9 at an angle of 45° or 135°, are laminated in an order from the upper electrode 2 side. Also, each of the upper electrode plate 1 and the lower electrode plate 3 is formed of a single layer or by laminating a plurality of layers via all over bonding. First to third embodiments of the present invention are characterized in that in each of such low-reflection touch panels, the upper electrode plate 1 has a 0.15 to 0.8 mm thick, optically isotropic heat-resistant transparent resin plate 8 having a property of a glass transition temperature of not less than 150° C., and that the heat-resistant transparent resin plate 8 is bonded directly or indirectly with the quarter wave plate 9 all over (see FIGS. 1 to 3), i.e. the heat-resistant transparent resin plate is co-extensive with the quarter wave plate. It is noted here that in individual embodiments of the present invention, the term "plate" includes thin ones of sheets or films or the like.

The quarter wave plate 9 has a function of converting linearly polarized light into circularly polarized light or generally circularly polarized light by giving a time-base phase shift (phase difference) to polarized light of mutually perpendicular two components resulting from decomposition of linearly polarized light, where one polarized component is retarded in phase behind another polarized component by ¼ wavelength. This ¼ wavelength is referred to as a central wavelength (approx. 550 nm) of a visible region (approx. 400 nm to 700 nm). The quarter wave plate 9 is given by one which is formed by uniaxially drawing a transparent resin plate of polycarbonate, polyarylate, polyethersulfone, polysulfone, norbornene resin, or the like and controlling a refractive index of an x direction, which is a drawing direction (direction of optical axis), a refractive index of a y direction perpendicular to the x direction, and a refractive index of a thicknesswise direction, i.e., a z direction perpendicular to the x and y directions.

The quarter wave plate 9, in combination with the polarizing plate 10 of its upper surface, forms an anti-reflection filter of a circular polarization type. Light from an external source such as an indoor fluorescent lamp or an outdoor light passes through the polarizing plate 10, becoming linearly polarized light, and is transmitted by the quarter wave plate 9, becoming circularly polarized light, where even if the light is reflected by the transparent conductive film, the circularly polarized light, when passing again through the quarter wave plate 9, changes into linearly polarized light vertical to a transmission axis of the polarizing plate 10, so that reflected light is suppressed. In addition, as the quarter wave plate 9, one having flexibility to facilitate input by pen or finger is used.

The polarizing plate 10 to be disposed at the upper surface of the quarter wave plate 9 is so formed that its absorption axis forms an angle of 45° or 135° with the optical axis of the quarter wave plate 9. As the polarizing plate 10, generally, one formed by drawing a polyvinyl alcohol plate impregnated with iodine, dye, or other dichromatic pigments and then covered with a cellulose- or acrylic protective coat on both sides, or another is used.

The quarter wave plate 9 and the polarizing plate 10, and/or the quarter wave plate 9 and the heat-resistant transparent resin plate 8, may be bonded together directly all over (see FIGS. 1 to 3), or may be bonded together indirectly via an optically isotropic transparent resin plate. Adhesives to be used for the bonding may be given by acrylate ester copolymer or other acrylic resins, urethane resins, silicon resins, rubber resins, aqueous or UV-curable adhesives, and the like. Also, material of the optically isotropic transparent resin plate is preferably given by ones of excellent transparency such as polycarbonate, polyarylate, polyethersulfone, polysulfone, and norbornene resins. It is noted that the term "optical isotropy" in the above embodiments of the present invention refers to those having a retardation value of not more than 10 nm, preferably not more than 5 nm.

Material of the heat-resistant transparent resin plate 8 is given by an optically isotropic transparent resin having a glass transition temperature of not less than 150° C. molded to a thickness of 0.15 to 0.8 mm, with the optically isotropic transparent resin being selected from among polycarbonate resins, norbornene resins, epoxy resins, siloxane resins, polyarylate resins, polyethersulfone resins, polysulfone resins, ultraviolet-curable acrylic resins, epoxy acrylic resins, and other heat-resistant acrylic resins.

The heat-resistant transparent resin plate 8 of the above embodiments of the present invention, as one constituent layer of the upper electrode plate 1, is bonded together with the quarter wave plate 9 and the polarizing plate 10 all over so as to almost fully suppress thermal expansion of the quarter wave plate 9 and the polarizing plate 10, and to thereby maintain a stable state free from occurrence of waviness and strain under a high-temperature environment over 70° C. such as in a vehicle with its windows closed under summer's direct sunlight, or even under high-temperature, high-humidity environments with humidity over 80% such as on rainy days, as with glass plates. Accordingly, a material that will not be deformed due to heat even under such high-temperature or high-humidity environments is required. As indices therefor are glass transition temperature and absorption coefficient, an optically isotropic transparent resin plate having a glass transition temperature of not less than 150° C. and an absorption coefficient of not more than 1.3% can be used as the heat-resistant transparent resin plate 8 of each embodiment of the present invention. More preferably, a heat-resistant transparent resin plate 8 having a glass transition temperature of not less than 170° C. is used. As to a reason for setting the absorption coefficient of the heat-resistant transparent resin plate 8 to not more than 1.3%, if the absorption coefficient of the heat-resistant transparent resin plate 8 is beyond 1.3%, the heat-resistant transparent resin plate 8 could be deformed due to moisture content that has penetrated through the polarizing plate 10 or moisture content that has penetrated through side faces, and once the heat-resistant transparent resin plate 8 has been deformed, the polarizing plate 10 and the quarter wave plate 9 could no longer be held by the heat-resistant transparent resin plate 8. Also, for the same reason, the upper electrode plate also could be deformed along with the heat-resistant transparent resin plate 8, which could cause the upper electrode plate to be brought into contact with the lower electrode plate, resulting in occurrence of insulation failures. Conversely, with the absorption coefficient of the heat-resistant transparent resin plate 8 set to not more than 1.3%, even if the heat-resistant transparent resin plate 8 is slightly deformed, this deformation would not cause the upper electrode plate 1 to be brought into contact with the lower electrode plate 3, thus posing no problems in terms of touch panel performance.

More preferably, the absorption coefficient of the heat-resistant transparent resin plate 8 is set to not more than 1% from within the range of not more than 1.3%. A reason for this is that setting the absorption coefficient to not more than 1% almost fully prevents the heat-resistant transparent resin plate 8 from deformation due to moisture content that has penetrated through the polarizing plate 10, or moisture content that has penetrated through side faces, so that the polarizing plate 10 and the quarter wave plate 9 can be held more securely by the heat-resistant transparent resin plate 8.

In contrast to this, conventionally, since such a heat-resistant transparent resin plate is not provided, the polarizing plate, upon absorption of water, would be deformed due to this water absorption, in which case the quarter wave plate could not endure stress, leading to occurrence of deformation of the upper electrode plate, and resultantly non-uniformities of color might occur due to retardation changes. Further, a deformed upper electrode plate could be brought into contact with the lower electrode plate, bringing about insulation failures or others, which has been a cause of troubles in touch panel performance.

In contrast to this, in these embodiments, by the disposition of the heat-resistant transparent resin plate 8 having an absorption coefficient of not more than 1.3% as described above, the heat-resistant transparent resin plate 8, which is less affected by moisture content that has penetrated through the polarizing plate 10, is less liable to deformation, thereby allowing a resultant stress to be held against expansion or deformation of the polarizing plate 10, and the upper electrode plate 1 is never brought into contact with the lower electrode plate 3, thus allowing touch panel performance to be kept from impairments.

In order to keep the quarter wave plate 9 and the polarizing plate 10 in a stable state free from occurrence of waviness or strain, the heat-resistant transparent resin plate 8 needs to be not less than 0.15 mm thick. Even with a glass transition temperature of not less than 150° C., if the heat-resistant transparent resin plate 8 is less than 0.15 mm thick, the heat-resistant transparent resin plate 8 itself is not deformed due to heat, but cannot withstand a force with which the quarter wave plate 9 and the polarizing plate 10 tend to be deformed. More preferably, a heat-resistant transparent resin plate 8 having a thickness of not less than 0.2 mm is used.

Also, the heat-resistant transparent resin plate 8 of each embodiment of the present invention, with its thickness set to not more than 0.8 mm, allows input by pen or finger to be performed adequately lightly even when incorporated as one constituent layer of the upper electrode plate 1 by virtue of its high flexibility as compared with glass plates. More preferably, a heat-resistant transparent resin plate 8 having a thickness of not more than 0.7 mm is used. Still, the heat-resistant transparent resin plate 8 will not fracture, unlike glass plates, thus greatly facilitating handling of the touch panel during an assembly process, and eliminating a possibility of damage during input operations with the touch panel. Moreover, a rolling process as well becomes applicable, which facilitates a defoaming process or the like during a bonding process.

Table 1 below shows flexure amounts resulting from pressurizing the foregoing heat-resistant transparent resin plates A to C and a glass plate, each having a size of 130 mm×100 mm and a glass transition temperature of 195° C., with φ20-mm dia. steel balls placed at upper-surface central portions.

TABLE 1

|  | Thickness (mm) | Static pressure (gf) | Flexure amount (mm) |
| --- | --- | --- | --- |
| Glass plate | 0.2 | 200 | 0.9 |
| Heat-resistant transparent resin plate A | 0.2 | 200 | 2.7 |
| heat-resistant transparent resin plate B | 0.4 | 200 | 1.7 |
| Heat-resistant transparent resin plate C | 0.8 | 200 | 1.1 |

There is a triple difference in flexure amount between the heat-resistant transparent resin plate A and the glass plate, which are of the same thickness, under the same static-pressure condition. The 0.2 mm thick glass plate is smaller in flexure amount, even when compared with the heat-resistant transparent resin plate C whose thickness is increased to 0.8 mm, which is an upper limit. In order to enable a comfortable input operation, the glass plate needs to be set to a thickness of less than 0.2 mm, resulting in higher likelihood of fracture.

The heat-resistant transparent resin plate 8, in the upper electrode plate 1, may be disposed between the quarter wave plate 9 and the polarizing plate 10 (see FIG. 3), or may be disposed on one side of the quarter wave plate 9 closer to the upper electrode 2 (see FIG. 1), or may be disposed on one of the polarizing plate 10 farther from the upper electrode 2 (see FIG. 2). Also, in these cases, an optically isotropic transparent resin plate may be interposed between the heat-resistant transparent resin plate 8 and the quarter wave plate 9 or the polarizing plate 10.

As material of the transparent conductive film to be provided as the upper electrode 2 at the lower surface of the upper electrode plate 1 as described above, thin films of such metal oxides as tin oxide, indium oxide, antimony oxide, zinc oxide, cadmium oxide, or ITO, and thin films of such metals as gold, silver, copper, tin, nickel, aluminum, and palladium are provided. A formation method for the transparent conductive film onto the upper electrode plate 1 may be a vacuum deposition process, sputtering process, ion plating process, CVD process, or the like. This is applicable also to a transparent conductive film to be provided as the lower electrode 4 at the upper surface of the lower electrode plate 3.

Next, the lower electrode plate 3 is explained. The lower electrode plate 3 is formed of a single layer or by laminating a plurality of layers all over surfaces. For example, glass plates or laminates of these plates may be used in addition to the above-described optically isotropic transparent resin plate. Also, in a case where a display is an LCD, with only one quarter wave plate 9, since linearly polarized light incident for display use from an LCD side would also be changed into circularly polarized light, a quarter wave plate whose optical axis perpendicularly crosses the quarter wave plate 9 in the upper electrode plate 1 is further disposed in the lower electrode plate 3, by which a phase is canceled. In this case, the lower electrode plate 3 may be formed of a single layer of the quarter wave plate, or may be formed of a laminate of optically isotropic transparent resin plates and glass plates. In addition, even in a case where the display is an LCD, providing a second quarter wave plate on a surface of the LCD may eliminate a need for providing a second quarter wave plate in the lower electrode plate 3 of the touch panel of the above embodiments of the present invention.

Also, the upper electrode plate 1 in which the upper electrode 2 is provided and the lower electrode plate 3 in which the lower electrode 4 is provided are, normally, bonded and fixed by an adhesive layer 5 of double-sided adhesive tape or transparent adhesive material or the like only in regions other than the display area, with the air layer 6 left in the display area. In this case, the quarter wave plate 9 is bonded and fixed only in the non-display area regions directly, or indirectly via the optically isotropic transparent resin plate, with the lower electrode plate 3. Therefore, in order to maintain anti-reflection characteristics of this low-reflection touch panel, it is necessary that stress will not be applied only to peripheral portions of the quarter wave plate 9 under high-temperature environments. In these embodiments of the present invention, since the upper electrode plate 1 has the heat-resistant transparent resin plate 8 as described before, and the heat-resistant transparent resin plate 8 is bonded all over directly or indirectly with the quarter wave plate 9, stress applied to the quarter wave plate 9 can be dispersed, thereby making it possible to almost fully suppress occurrence of retardation changes. That is, anti-reflection characteristics are less impaired.

In a case where the touch panel is large sized in area, fine-dot spacers 7 are formed on a surface of either the upper electrode 2 or the lower electrode 4 in order to prevent the upper electrode plate 1, in which the upper electrode 2 is provided therein, from making contact by its dead weight with the lower electrode plate 3, in which the lower electrode 4 is provided therein. These spacers 7 can be obtained by forming a transparent photocurable resin into fine dots by performing a photo-process. Otherwise, the spacers 7 can also be given by forming a multiplicity of fine dots by performing a printing process.

Furthermore, the polarizing plate 10 or the heat-resistant transparent resin plate 8, whichever serves as an uppermost surface of the upper electrode plate 1, may be subjected to a low-reflection treatment, anti-fouling treatment, or satin treatment. Otherwise, a film subjected to these treatments may be bonded, as a satin layer 20 with low-reflection and anti-fouling functions, onto the polarizing plate 10 or the heat-resistant transparent resin plate 8 via an adhesive or the like (see one-dot chain lines in FIGS. 1 and 2). In this case, the low-reflection treatment may be exemplified by applying a low-reflection material using fluororesin, silicon resin, or the like, or by forming a multilayer film of metal by a vacuum deposition process, sputtering process, or the like. This film is desirably one having a moisture-proof property. For example, with use of a 40 μm to 80 μm thick PET (polyethylene terephthalate) film, a satin layer 20 with moisture-proof, low-reflection, and anti-fouling functions is desirably formed on the polarizing plate 10 or the heat-resistant transparent resin plate 8. By virtue of its excellent moisture-proofness, the PET film, by being bonded to the top surface of the polarizing plate 10, can prevent penetration of water into the upper electrode plate 1. It is also desirable to use a PET film which has been reduced in terms of shrinkability by being preparatorily subjected to heat treatment. The anti-fouling treatment is exemplified by applying an anti-fouling material using fluororesin or the like. The satin treatment is exemplified by sand blasting, embossing, mat coating, etching, or the like.

From among the first to third embodiments of FIGS. 1 to 3, the structure of FIG. 3 is preferred to the others, wherein by disposition of the heat-resistant transparent resin plate 8 between the polarizing plate 10 and the quarter wave plate 9, the heat-resistant transparent resin plate 8 serves as a support plate for each optical plate, so that expansion of the polarizing plate 10 or the quarter wave plate 9 is suppressed even under high-temperature or high-humidity environments, thus making retardation changes or deterioration of optical characteristics less likely to occur. Further, in the first and second embodiments of FIGS. 1 and 2, since the polarizing plate 10 and the quarter wave plate 9 are directly bonded together, there is indeed a higher tendency towards an occurrence of waviness and strain as compared with the structure of FIG. 3, but in such a case, measures can be taken as required by increasing a thickness of the heat-resistant transparent resin plate 8 for the structure of FIG. 2.

Figure 8:
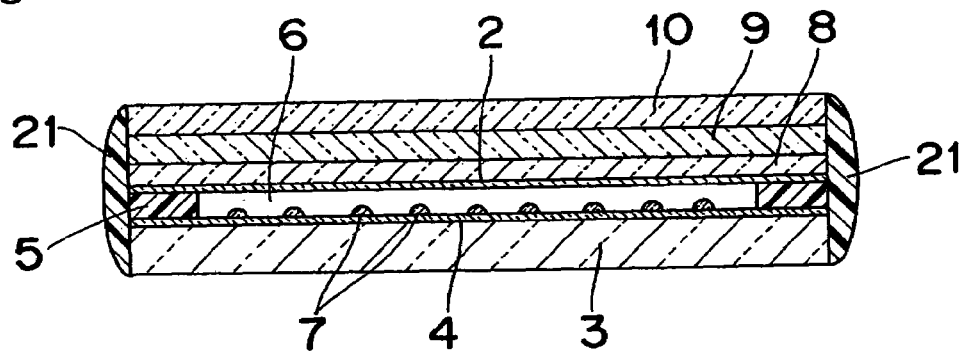
FIG. 8 is a sectional view showing a low-reflection touch panel having high durability according to another embodiment of the present invention.
Figure 9:
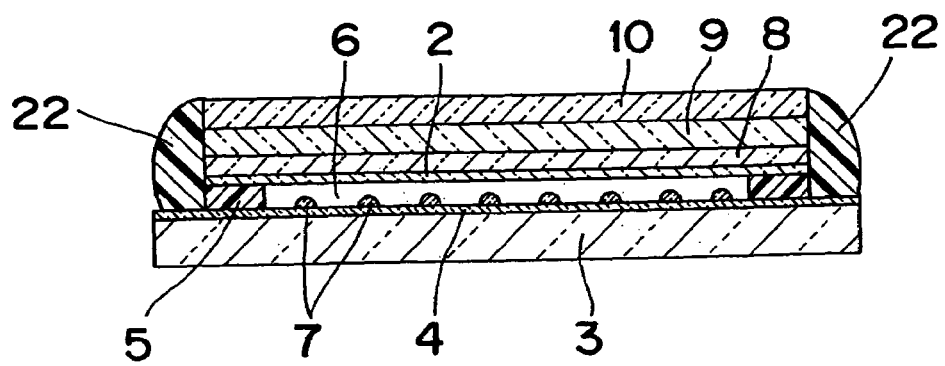
FIG. 9 is a sectional view showing a low-reflection touch panel having high durability according to yet another embodiment of the present invention.

Furthermore, as another embodiment of the present invention, in a case where the upper electrode plate 1 and the lower electrode plate 3 are generally identical in configuration to each other as shown in FIG. 8, a seal layer 21 may be formed by applying a seal material so as to cover therewith side-end peripheries of the upper electrode plate 1 and the lower electrode plate 3. Also, as another embodiment of the present invention, as shown in FIG. 9, upper electrode plate 1 is smaller than lower electrode plate 3, and a seal layer 22 may be formed by applying a seal material so as to cover therewith end-portion peripheries of the upper electrode plate 1 and edge-portion peripheries of the lower electrode plate 3. As to a type of the seal material, UV-curable resins, thermo-UV curable resins, acrylic-, epoxy-, urethane-, silicon-base, or other thermosetting resins are preferable. A seal method is exemplified by a dispense method. Thus, by the seal layer 21, 22, penetration of water through end portions of the upper electrode plate 1 and the like can be prevented, so that deterioration of adhesive layer 5 of double-sided adhesive tape or transparent adhesive material or the like can be prevented.

Even if the adhesive layer 5 of double-sided adhesive tape or transparent adhesive material or the like, that is less affected even under high-temperature, high-humidity environments and that keeps the upper electrode plate 1 and the lower electrode plate 3 bonded together, is peeled off, the seal layer 21, 22 serves to hold the upper electrode plate 1 and the lower electrode plate 3, so that touch panel characteristics are not impaired.

According to the foregoing embodiments, in a high-durability touch panel having an anti-reflection filter of a circular polarization type, the upper electrode plate 1 has a 0.15 to 0.8 mm thick optically isotropic transparent resin plate 8 having a characteristic of a glass transition temperature of not less than 150° C., and the heat-resistant transparent resin plate 8 is laminated directly or indirectly on the quarter wave plate 9 all over their surfaces. Therefore, thermal expansion of the quarter wave plate 9 and the polarizing plate 10 can be almost fully suppressed even under a high-temperature environment over 70° C. such as in a vehicle with its windows closed under summer's direct sunlight, as with glass plates, so that a stable state free from occurrence of waviness or strain can be maintained. Also, since the heat-resistant transparent resin plate 8 is laminated directly or indirectly on the quarter wave plate 9 all over their surfaces, stress applied to the quarter wave plate 9 can be dispersed so that occurrence of retardation changes can be almost fully suppressed even under the above high-temperature environment, as with glass plates. That is, anti-reflection characteristics are less impaired.

Accordingly, a high-durability touch panel is free from occurrence of deformation of its appearance configuration as well as deterioration of its anti-reflection characteristics due to retardation changes even if left under a high-temperature environment for a long time, allows comfortable input operations to be performed, and yet is successful in workability during an assembly process.

Further, by virtue of the heat-resistant transparent resin plate 8 having high flexibility as compared with glass plates, the high-durability touch panel allows input by pen or finger to be performed lightly, thus enabling comfortable input operations.

Also, since the heat-resistant transparent resin plate 8 is less liable to fracture unlike thin glass plates, handling of the touch panel during an assembly process is greatly facilitated, and a possibility that glass may be damaged during input operations with the touch panel is eliminated.

Further, even if left under a high-temperature environment for a long time, the high-durability touch panel is free from occurrence of deformation of its appearance configuration as well as deterioration of its anti-reflection characteristics due to retardation changes, allows comfortable input operations to be performed, and yet is successful in workability during an assembly process.

The high-durability touch panel of the present invention has a constitution as described above, thus producing the following effects.

That is, in the touch panel having an anti-reflection filter of a circular polarization type, the upper electrode plate has the 0.15 to 0.8 mm thick optically isotropic heat-resistant transparent resin plate having a characteristic of a glass transition temperature of not less than 150° C., and the heat-resistant transparent resin plate is laminated directly or indirectly on the quarter wave plate all over their surfaces. Therefore, thermal expansion of the quarter wave plate and the polarizing plate are almost fully suppressed even under a high-temperature environment over 70° C. such as in a vehicle with its windows closed under summer's direct sunlight, as with glass plates, so that a stable state free from occurrence of waviness or strain can be maintained. Also, since the heat-resistant transparent resin plate is laminated directly or indirectly on the quarter wave plate all over their surfaces, stress applied to the quarter wave plate can be dispersed so that occurrence of retardation changes can be almost fully suppressed even under the above high-temperature environment, as with glass plates. That is, the anti-reflection characteristics are less impaired.

Still, since the heat-resistant transparent resin plate is highly flexible as compared with a glass plate, input by pen or finger becomes lighter, thereby allowing comfortable input operations to be performed.

Also, by provision of a heat-resistant transparent resin plate having an absorption coefficient of not more than 1.3%, the heat-resistant transparent resin plate is less affected by moisture that has penetrated through the polarizing plate, and therefore less liable to deform, thereby allowing resultant stress to be held against expansion or deformation of the polarizing plate, and the upper electrode plate is never brought into contact with the lower electrode plate, thus allowing touch panel performance to be kept from impairment. It is noted here that as a reason for setting the absorption coefficient of the heat-resistant transparent resin plate to not more than 1.3%, if the absorption coefficient of the heat-resistant transparent resin plate is beyond 1.3%, the heat-resistant transparent resin plate could be deformed due to moisture that has penetrated through the polarizing plate or moisture that has penetrated through side faces, and once the heat-resistant transparent resin plate has been deformed, the polarizing plate and the quarter wave plate could no longer be maintained by the heat-resistant transparent resin plate. Also, for the same reason, the upper electrode plate also could be deformed along with the heat-resistant transparent resin plate, which could cause the upper electrode plate to be brought into contact with the lower electrode plate, thereby resulting in occurrence of insulation failures. Conversely, with the absorption coefficient of the heat-resistant transparent resin plate set to not more than 1.3%, even if the heat-resistant transparent resin plate is slightly deformed, this deformation would not cause the upper electrode plate to be brought into contact with the lower electrode plate, thus posing no problems in terms of touch panel performance.

Further, more preferably, the absorption coefficient of the heat-resistant transparent resin plate is set to not more than 1% from within the range of not more than 1.3%. A reason for this is that setting the absorption coefficient to not more than 1% almost fully prevents the heat-resistant transparent resin plate from deformation due to moisture that has penetrated through the polarizing plate or moisture that has penetrated through side faces so that the polarizing plate and the quarter wave plate can be held more securely by the heat-resistant transparent resin plate.

In contrast to this, conventionally, since such a heat-resistant transparent resin plate is not provided, the polarizing plate, upon absorption of water, would be deformed due to this water absorption, in which case the quarter wave plate could not endure stress, leading to occurrence of deformation of the upper electrode plate, and resultantly non-uniformities of color might occur due to retardation changes. Further, a deformed upper electrode plate could be brought into contact with the lower electrode plate, bringing about insulation failures or others, which has been a cause of troubles in terms of touch panel performance. Such problems can be solved by the present invention.

Also, since the heat-resistant transparent resin plate is less liable to fracture, unlike thin glass plates, handling of the touch panel during an assembly process is greatly facilitated, and a possibility that glass may be damaged during input operations with the touch panel is eliminated.

By properly combining arbitrary embodiments of the aforementioned various embodiments, effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A touch panel comprising:
    an upper electrode plate including a lamination of
        (i) an upper electrode formed as a transparent conductive film and defining a lower surface of said upper electrode plate,
        (ii) a polarizing plate,
        (iii) a quarter wave plate between said upper electrode and said polarizing plate, with an absorption axis of said polarizing plate crossing an optical axis of said quarter wave plate at an angle of 45° or 135°, and
        (iv) a 0.15 to 0.80 mm thick optically isotropic heat-resistant transparent resin plate having a glass transition temperature of not less than 150° C. and an absorption coefficient of not more than 1.3%, said heat-resistant transparent resin plate being laminated directly to, or indirectly to, said quarter wave plate, and being coextensive with said quarter wave plate; and
    a lower electrode plate including a lower electrode formed as a transparent conductive film and defining an upper surface of said lower electrode plate,
    wherein said upper electrode plate and said lower electrode plate are bonded and fixed to one another at regions except for a display area so that said upper electrode and said lower electrode oppose each other with via an air layer, and
    wherein a seal layer covers side surfaces of said upper electrode plate and portions of said lower electrode plate that are adjacent said side surfaces such that said seal layer prevents penetration of water through said side surfaces of said upper electrode plate and said portions of said lower electrode plate into said touch panel and such that said side surfaces are not exposed.

2. The touch panel according to claim 1, wherein said glass transition temperature of said heat-resistant transparent resin plate is not less than 170° C.

3. The touch panel according to claim 1, wherein said absorption coefficient of said heat-resistant transparent resin plate is not more than 1%.

4. The touch panel according to claim 1, wherein one of said polarizing plate and said heat-resistant transparent resin plate defines an upper surface of said upper electrode plate, and further comprising:
    a moisture-proof PET film, as a satin layer, on said upper surface of said upper electrode plate, said moisture-proof PET film having low-reflection and antifouling functions.

5. The touch panel according to claim 1, wherein said heat-resistant transparent resin plate is 0.20 to 0.70 mm thick.

6. The touch panel of claim 1, wherein said seal layer covers side-end peripheries of said polarizing plate, said quarter wave plate and said transparent resin plate.

7. A touch panel comprising:

an upper electrode plate including a lamination of
- (i) an upper electrode formed as a transparent conductive film and defining a lower surface of said upper electrode plate,
- (ii) a polarizing plate,
- (iii) a quarter wave plate between said upper electrode and said polarizing plate, with an absorption axis of said polarizing plate crossing an optical axis of said quarter wave plate at an angle of 45° or 135°, and
- (iv) a 0.15 to 0.80 mm thick optically isotropic heat-resistant transparent resin plate having a glass transition temperature of not less than 150° C. and an absorption coefficient of not more than 1.3%, said heat-resistant transparent resin plate being laminated directly to, or indirectly to, said quarter wave plate, and being coextensive with said quarter wave plate; and a lower electrode plate including a lower electrode formed as a transparent conductive film and defining an upper surface of said lower electrode plate, wherein said upper electrode plate and said lower electrode plate are bonded and fixed to one another at regions except for a display area so that said upper electrode and said lower electrode oppose each other with via an air layer, wherein said upper electrode plate has peripheral side surfaces that extend in a direction orthogonal to a plane of said lower surface of said upper electrode plate, and wherein a seal layer covers and is positioned on said peripheral side surfaces of said upper electrode plate and portions of said lower electrode plate that are adjacent said peripheral side surfaces in a manner so as to prevent penetration of water into said touch panel through said peripheral side surfaces and said portions of said lower electrode plate that are adjacent said peripheral side surfaces.

8. The touch panel according to claim 7, wherein said glass transition temperature of said heat-resistant transparent resin plate is not less than 170° C.

9. The touch panel according to claim 7, wherein said absorption coefficient of said heat-resistant transparent resin plate is not more than 1%.

10. The touch panel according to claim 7, wherein one of said polarizing plate and said heat-resistant transparent resin plate defines an upper surface of said upper electrode plate, and further comprising:

a moisture-proof PET film, as a satin layer, on said upper surface of said upper electrode plate, said moisture-proof PET film having low-reflection and antifouling functions.

11. The touch panel according to claim 7, wherein said heat-resistant transparent resin plate is 0.20 to 0.70 mm thick.

12. The touch panel of claim 7, wherein said seal layer covers side-end peripheries of said polarizing plate, said quarter wave plate and said transparent resin plate.

* * * * *

UNITED STATES PATENT AND TRADEMARK OFFICE
CERTIFICATE OF CORRECTION

| | | |
|---|---|---|
| PATENT NO. | : 7,589,798 B2 | Page 1 of 1 |
| APPLICATION NO. | : 10/488558 | |
| DATED | : September 15, 2009 | |
| INVENTOR(S) | : Takahata et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Fourteenth Day of December, 2010

David J. Kappos
*Director of the United States Patent and Trademark Office*